April 16, 1963  F. J. MEYERS  3,086,102
HINGED OVEN HEATING ELEMENT
Filed Jan. 4, 1961
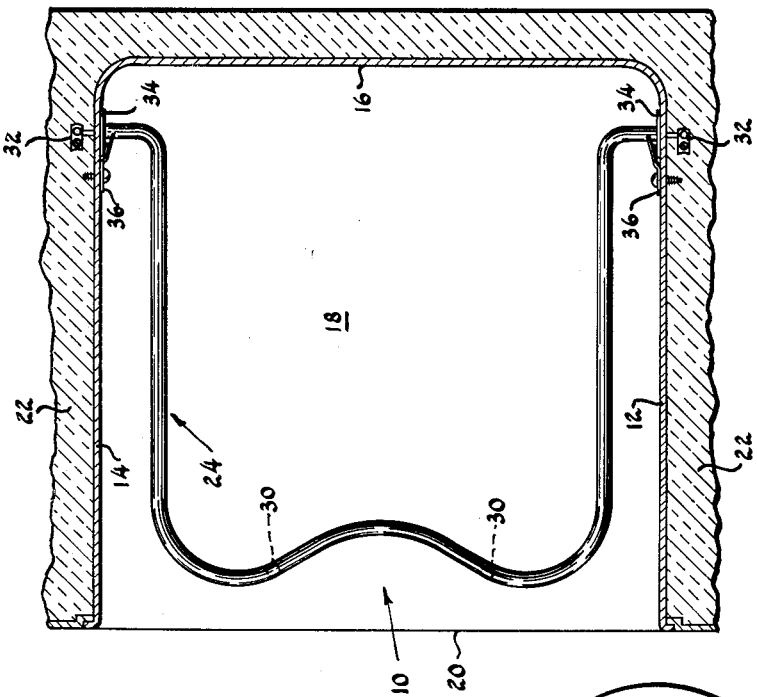
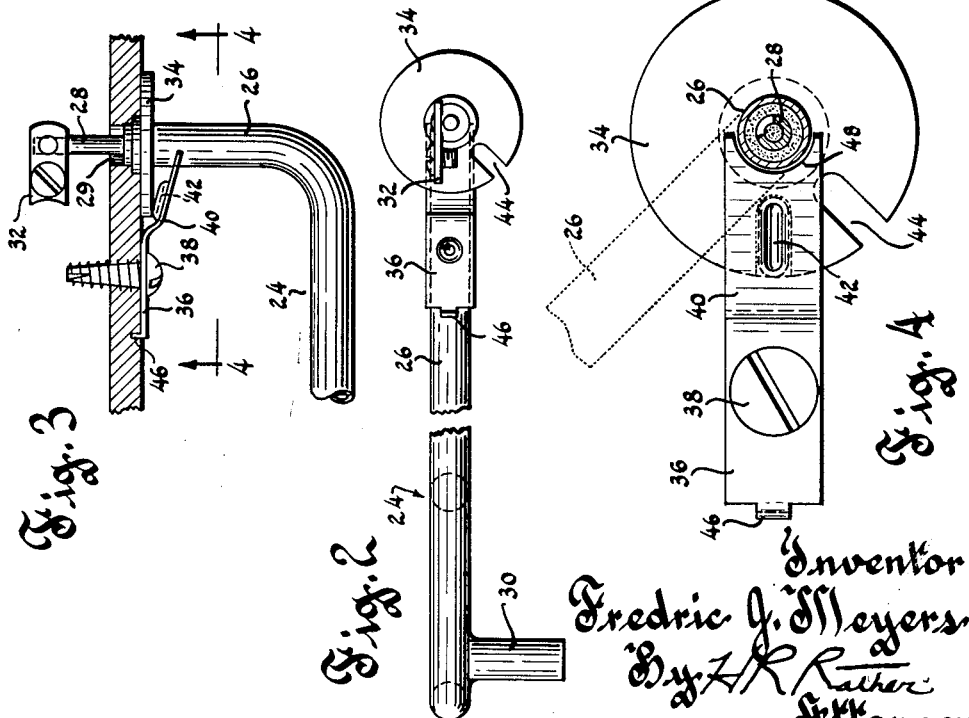
Inventor
Fredric J. Meyers
By H. R. Rather
Attorney

United States Patent Office 3,086,102
Patented Apr. 16, 1963

3,086,102
HINGED OVEN HEATING ELEMENT
Fredric J. Meyers, Los Altos, Calif., assignor to Cutler-Hammer, Inc., Milwaukee, Wis., a corporation of Delaware
Filed Jan. 4, 1961, Ser. No. 80,585
4 Claims. (Cl. 219—37)

This invention relates to an electrical heating apparatus for a range oven and more particularly to an improved mounting arrangement for pivotally supporting a tubular sheath heating element therein.

The primary object of this invention is to provide an improved mounting arrangement of this type which is simple, economical and easily installed.

Another object is to provide an arrangement wherein a permanent electrical ground for the element is provided without the necessity of a separate ground wire or connection.

Stated briefly, the electrical heating apparatus of this invention includes a heater assembly pivotally mounted in the side walls of the oven liner. The ends of the heater element extend through openings in the side walls and have washers fixedly mounted thereon and adapted for flush engagement with the inside of the side walls. A pair of spring clips are fastened to the walls adjacent the washers which have spring arm portions which lie in frictional engagement with the washers. The spring clips and washers are provided with registering detent portions adapted to retain the heater assembly in a raised position to permit cleaning of the oven. The spring clip members not only securely retain the ends of the heater in the side walls but further provide a permanent electrical ground and thereby eliminate the necessity of a separate ground wire or connection.

Other objects and advantages will be pointed out in, or be apparent from the specification and claims, as will obvious modifications of the single embodiment shown in the drawings, in which:

FIGURE 1 is a fragmentary plan view, partially in section, of an electric range oven provided with a heating element and mounting arrangement constructed in accordance with the present invention;

FIG. 2 is a side elevation view of the element and mounting apparatus therefor shown in FIG. 1 prior to installation in an oven but having terminal clips mounted thereon;

FIG. 3 is an enlarged fragmentary plan view of one end of the element and mounting apparatus shown in FIG. 1; and FIG. 4 is a sectional view taken along line 4—4 of FIG. 3.

Referring to the drawings, the numeral 10 designates an oven compartment defined by side walls 12 and 14, rear wall 16, bottom wall 18 and a top wall (not shown). Compartment 10 has a front opening 20 with walls 12, 14, 16, 18 and the top wall forming an oven liner which is preferably surrounded by insulating material 22 supported in a range body (not shown).

Oven compartment 10 is heated by a heater assembly 24 of substantially U-shaped configuration. Assembly 24 may be of any suitable internal construction and includes a tubular metal sheath 26 having a resistor element 28 mounted therein (FIG. 4).

U-shaped assembly 24 is horizontally disposed in compartment 10 with its ends bent at right angles to each leg for mounting in openings 29 in side walls 12 and 14 of the oven liner as shown in FIGS. 1 and 3. The assembly 24 is supported parallel to bottom 18 by a pair of spacer supports 30, 30 welded or otherwise fastened to sheath 26 as shown in FIG. 2. The resistor element 28 of assembly 24 is electrically connected to a source of electricity by means of connector terminals 32 welded or otherwise fastened to the ends of element 28 which extend through side walls 12 and 14.

Assembly 24 is mounted in side walls 12 and 14 for pivotal movement about a horizontal axis between a horizontal operating position and a raised position (to facilitate cleaning the oven compartment 10) by means of a washer 34 and cooperating spring catch member 36 mounted at each end of the assembly as shown in detail in FIGS. 3 and 4. Washers 34 are fixedly mounted on sheath 26 by any suitable means such as by extruding an opening in the washer, inserting the sheath therethrough and then pressing the extruded washer material flat against the washer to clinch the washer to the sheath. The washers and sheath are frictionally engaged and retained in place by spring catch members 36. Each catch member 36 is fastened to the oven side wall by a screw 38 and has an offset spring arm portion 40 in frictional engagement with the face of a washer 34. An upset portion 42 on each spring arm 40 is provided for engagement with a radial notch or detent 44 in washer 34, as clearly shown in FIG. 4, to hold heater assembly 24 in raised position when it is desired to clean the oven.

Each spring catch member 36 is provided with a lug 46 at one end adapted for engagement with a small opening or detent in the side wall to prevent the catch member from rotating on screw 38. The other end of the catch member is notched as at 48 to fit snugly around sheath 26 to further anchor the catch member in proper position.

It will be apparent from the foregoing that the above described arrangement provides a very economical method of mounting a heater assembly in an oven. It is only necessary to provide three pierced holes in sides 12 and 14 of the oven liner. The ends of element 24 are then readily snapped into place in the proper openings to hold the element in place while spring clips 36 are installed. The spring arms 40 of the clips serve as sliding electrical contacts with washers 34 to thus provide a permanent electrical ground of metal sheath 26 to the oven liner and thereby obviate the necessity of a separate ground wire or connection.

Although but one embodiment of the present invention has been illustrated and described, it will be apparent to those skilled in the art that various changes and modifications may be made therein without departing from the spirit of the invention or from the scope of the appended claims.

I claim:

1. Electric heating apparatus for a range oven having an oven compartment enclosed by an oven liner comprising, a heater assembly including a tubular metal sheath having a resistor element mounted therein, openings in the side walls of the oven liner adapted to receive the ends of said sheath to permit pivotal up and down movement of said heater assembly in the oven compartment, a pair of washer members fixedly mounted on said sheath and adapted for engagement with the inside of the side walls, a pair of spring clip members fastened to the side walls adjacent said washers, said spring clip members having spring arm portions in frictional engagement with washers, said spring arms having upset portions therein adapted for engagement with detents formed in said washers to retain said heater assembly in raised position.

2. Electric heating apparatus according to claim 1 in which said spring clip members have lugs thereon adapted for engagement with detents in the side walls of the oven liner.

3. Electric heating apparatus according to claim 1 in which the ends of said spring arms are notched to snugly engage said sheath.

4. Electric heating apparatus according to claim 1 in which said heater assembly is of substantially U-shaped configuration having its ends bent at substantially right angles to the legs of the U-shaped assembly for mounting in the side walls of the oven liner.

References Cited in the file of this patent

UNITED STATES PATENTS

| | | |
|---|---|---|
| 1,174,367 | Vogel | Mar. 7, 1916 |
| 1,637,435 | Brown | Aug. 2, 1927 |
| 2,844,703 | Prather | July 22, 1958 |

FOREIGN PATENTS

| | | |
|---|---|---|
| 783,533 | Great Britain | Sept. 25, 1957 |